(12) United States Patent     (10) Patent No.:   US 12,701,337 B2

Chatterjee     (45) Date of Patent:     Aug. 4, 2026

---

(54) CAMERA SHUTTER

(71) Applicant: Google LLC, Mountain View, CA (US)

(72) Inventor: Ishan Chatterjee, Seattle, WA (US)

(73) Assignee: Google LLC, Mountain View, CA (US)

( * ) Notice: Subject to any disclaimer, the term of this patent is extended or adjusted under 35 U.S.C. 154(b) by 211 days.

(21) Appl. No.: 18/326,439

(22) Filed: May 31, 2023

(65) Prior Publication Data

US 2024/0402573 A1     Dec. 5, 2024

(51) Int. Cl.
   *H04N 25/587*     (2023.01)
   *G02B 27/01*     (2006.01)
   *H04N 23/743*     (2023.01)
   *H04N 23/75*     (2023.01)

(52) U.S. Cl.
   CPC ......... *H04N 25/587* (2023.01); *H04N 23/743* (2023.01); *H04N 23/75* (2023.01); *G02B 2027/0138* (2013.01)

(58) Field of Classification Search
   CPC .... H04N 25/587; H04N 23/743; H04N 23/75; H04N 23/70; G02B 2027/0138
   USPC ............................................. 348/221.1, 224.1
   See application file for complete search history.

(56) References Cited

U.S. PATENT DOCUMENTS

| | | | |
|---|---|---|---|
| 9,936,194 B2 | 4/2018 | Stein | |
| 11,054,718 B1 * | 7/2021 | Khan | ................. G02F 1/133528 |
| 11,089,196 B1 | 8/2021 | Hampton et al. | |
| 11,460,746 B2 | 10/2022 | Firka et al. | |
| 2008/0007645 A1 * | 1/2008 | McCutchen | ........... H04N 23/75 |
| | | | 348/E5.04 |
| 2017/0214837 A1 * | 7/2017 | Tamura | ................... H04N 23/72 |
| 2019/0045144 A1 * | 2/2019 | Reed | ..................... G01J 5/0806 |
| 2019/0079334 A1 * | 3/2019 | Firka | ................... G02F 1/13306 |
| 2020/0068107 A1 * | 2/2020 | Masuda | ................. H04N 23/75 |
| 2020/0111259 A1 * | 4/2020 | Sears | ................. G02B 27/0172 |
| 2020/0228693 A1 * | 7/2020 | Ishida | .................... H04N 23/75 |
| 2021/0096417 A1 * | 4/2021 | Firka | ................... G02F 1/13781 |
| 2022/0283442 A1 * | 9/2022 | Lee | .................... G02B 27/1013 |
| 2023/0326163 A1 * | 10/2023 | Yamasaki | .............. G06V 10/25 |
| | | | 348/370 |

* cited by examiner

*Primary Examiner* — Albert H Cutler

(74) *Attorney, Agent, or Firm* — Brake Hughes Bellermann LLP

(57)        ABSTRACT

A device includes a housing, a camera coupled to the housing, and a controller. The camera includes a lens, a shutter coaxial with the lens, and an image sensor coaxial with the lens and the shutter, where the image sensor is configured to receive light that passes through the shutter and the lens. The controller detects an amount of light received by the image sensor and controls the shutter by dimming the shutter based on the amount of light detected. In some examples, the shutter is an electrochromic shutter.

28 Claims, 10 Drawing Sheets

100

100

Housing 102

User Interface 140

Controller 120
Image Processor 122
Position/Orientation Sensor(s)124

Memory 126

Output System 128
- Display Device(s)
- Audio Output Device(s)

Communication Module 130

Camera 110

Shutter 112
First Area 113
Second Area 115

Lens 114

Image Sensor 116

Ambient Light Sensor 117

500

CAMERA SHUTTER

TECHNICAL FIELD

This description relates to a camera shutter.

BACKGROUND

A head mounted device may include a type of mobile electronic device that may be worn by a user, for example, on a head of the user. The head mounted device may include a camera and a display, as well as other components. The head mounted device may function as a virtual reality (VR) device, an augmented reality (AR) device, and/or a mixed reality device. Devices that include a camera (e.g., a world-facing camera) may be used, for example, for photography and/or recording.

SUMMARY

Devices and techniques are described herein that utilize a shutter on a camera to provide technical solutions related to technical problems and other problems. A camera may include a lens, a shutter, and an image sensor that receives light that passes through the shutter and the lens. In bright light environments, a controller may partially dim the shutter to avoid sensor saturation of the image sensor of the camera. The camera may capture multiple images in different dimming states and then combine the multiple images into a final image. In this manner, the different dimming states may be used to capture higher dynamic range images and combined into a single, high dynamic range image. Additionally, the shutter may function as a privacy shutter. For example, the controller may control the shutter to make it non-transparent to a bystander and to make it non-functional. In some examples, the camera is included as part of a head mounted device such as smart glasses, a headset, goggles, or the like. In some examples, the shutter is an electrochromic shutter.

According to one general aspect, a device includes a housing, a camera coupled to the housing, and a controller. The camera includes a lens, a shutter coaxial with the lens, and an image sensor coaxial with the shutter and the lens. The image sensor is configured to receive light that passes through the shutter and the lens. The controller detects an amount of light received by the image sensor and controls the shutter by dimming the shutter based on the amount of light detected.

In another general aspect, a method includes receiving, by an image sensor for a camera or by an ambient light sensor, light that passes through a shutter and a lens of the camera. The method includes detecting, by a controller, an amount of light received by the image sensor or by the ambient light sensor and controlling, by the controller, the shutter by dimming the shutter based on the amount of light detected.

In another general aspect, a computer program product that is tangibly embodied on a non-transitory computer-readable medium includes executable code that, when executed, is configured to cause an image sensor for a camera to receive light that passes through a shutter and a lens of the camera. The executable code causes a controller to detect an amount of light received by the image sensor and control the shutter by dimming the shutter based on the amount of light detected.

The details of one or more implementations are set forth in the accompanying drawings and the description below.

Other features will be apparent from the description and drawings, and from the claims.

DETAILED DESCRIPTION

In general, a camera may include a lens and an image sensor. In some lighting environments, bright light may saturate the image sensor and may impact the quality of images captured by the camera. For instance, a bright lighting environment may lead to overexposed images. To solve technical problems associated with light saturating the image sensor, the camera may include a shutter. A controller may dim the shutter to reduce the amount of light entering through the lens, which in turn reduces the amount of light received by the image sensor. In this manner, the partially dim shutter prevents light and/or other sensor saturation of the image sensor.

The controller may dim the shutter in different dim states, where each dim state allows a different amount of light to pass through the lens to the image sensor. The camera may capture images in different dim states and combine the images into a single image. In this manner, multiple captured images with different dim states can be combined to yield higher dynamic range imagery.

The shutter also may be used to mask out an area or areas of an image to avoid saturation of the image sensor and overexposure of the image. The shutter may be used to mask our an area or areas of an image for privacy purposes as well.

Furthermore, in general, camera use in public may trigger privacy concerns of a bystander unknowingly being photographed and/or recorded. For example, if the camera is implemented as part of a head mounted device, a bystander seeing a head mounted device pointed in their direction may think they are being recorded merely by the presence of a visible camera, even if the camera is not recording them. A technical problem arises for how to cover the camera. To solve this technical problem, the shutter may be used to cover the camera and to make the camera non-transparent and non-functional. In this example and the other examples, the shutter may be an electrochromic shutter that is controlled by a controller to electronically implement these and other features and functions.

Figure 1:
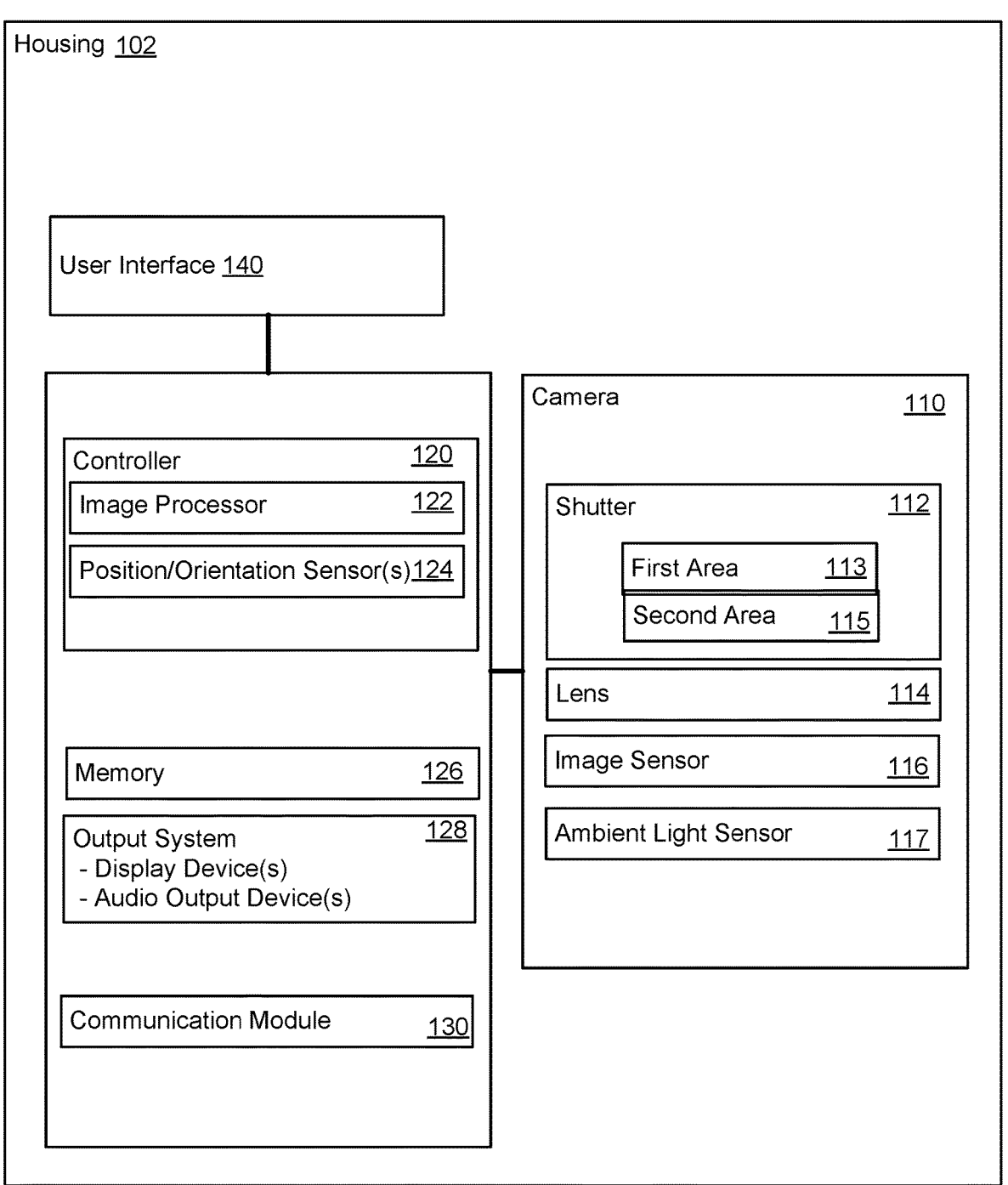
FIG. 1 is an example block diagram of an electronic device having a camera.

FIG. 1 is a block diagram of an electronic device 100. Examples of the electronic device 100 include, without limitation, mobile electronic devices such as a smart phone or a head mounted device. Examples of a head mounted device include devices intended to be worn on a head of a user such as, without limitation, glasses (e.g., smart glasses), a headset, and goggles. The head mounted device may function as a virtual reality (VR) device, an augmented reality (AR) device, and/or a mixed reality device.

The electronic device 100 may include a housing 102, a camera 110 coupled to or disposed within the housing 102, and a controller 120. The camera 110 may include a shutter 112, a lens 114, and an image sensor 116. In some examples, the camera 110 may include an optional ambient light sensor 117. The controller 120 may include an image processor 122 and position/orientation sensors 124. The electronic device 100 may further include a memory 126, an output system 128 (e.g., display device(s), audio output device(s), etc.), a communication module 130, and a user interface to receive user input.

In some examples, the camera 110 may include a single camera or multiple cameras. The camera 110 may be an outward, or world-facing camera that can capture still and/or moving images (e.g., video) of an environment outside of the electronic device 100. As mentioned above, such a world-facing camera may be a single camera or multiple cameras. In some examples, the multiple cameras may include the same features and parameters (e.g., focal length, aperture, field-of-view, resolution, etc.). In some examples, the multiple cameras may include different features and parameters. In some examples when the camera 110 includes multiple cameras, each of the cameras may include its own shutter 112 and its own lens 114. The multiple cameras may include their own image sensor 116 or the multiple cameras may use the same image sensor 116.

The camera 110 includes the shutter 112 coaxial with the lens 114. In some examples, the shutter is coupled to the lens 114. In some examples, external light first passes through the shutter 112 and then through the lens 114. In some examples, the order of the shutter 112 and the lens 114 are switched such that external light first passes through the lens 114 and then through the shutter 112. In the examples discussed below, light first passes through the shutter 112 and then through the lens 114 to the image sensor 116. The image sensor 116 is coaxial with the shutter 112 and the lens 114. The image sensor 116 receives the light that passes through the shutter 112 and the lens 114. The image sensor 116 may detect an amount of light received through the shutter 112 and the lens 114 at the image sensor 116. In general, the image sensor 116 detects and conveys information used to form an image by converting the variable attenuation of light waves into signals that are processed by the image processor 122 to render the image. The controller 120 may cause the rendered image to be displayed on the output system 128. In some examples, the image sensor 116 includes a complementary metal oxide semiconductor (CMOS) image sensor. In some examples, the image sensor 116 includes a charge coupled device (CCD) image sensor.

The controller 120 may include one or more controllers. The controller 120 may be a processor that includes various modules or engines configured to perform various functions, including executing code or instructions stored in the memory 126 to perform the various functions. For example, the controller 120 may be formed in a substrate configured to execute one or more machine executable instructions or pieces of software, firmware, or a combination thereof. The controller 120 can be semiconductor-based including semiconductor material that can perform digital logic. The memory 126 may include any type of non-transitory, computer-readable medium or storage device that stores information in a format that can be read and/or executed by the controller 120. The memory 126 may store applications and modules that, when executed by the controller 120, perform certain operations. In some examples, the applications and modules may be stored in an external storage device and loaded into the memory 126.

The controller 120 may use the image processor 122 and position/orientation sensor(s) 124 to control the functioning and operation of the camera 110 including the shutter 112, the lens 114 and the image sensor 116. The position/orientation sensor(s) 124 may include, for example, an inertial measurement unit (IMU), accelerometer, gyroscope, magnetometer, global positioning (GPS) sensor, and the like.

In some examples, the shutter 112 is an electronic shutter that is controlled by the controller 120. The shutter 112 may be an electrically adjustable shutter. The shutter 112 may be implemented as an electrochromic shutter. The shutter 112 may be implemented as a liquid crystal shutter, an electrowetting shutter, an electrophoretic shutter, a suspended particle shutter, or the like. The shutter 112 may be in either glass or plastic form and include one or more liquid crystal layers including, for example, layers formed of polymer dispersed liquid crystal (PDLC) material. For example, in a liquid crystal shutter, when a voltage is applied to the shutter 112 as a result of an electrical signal from the controller 120, the orientation of the liquid crystal molecules changes, which leads to light of a specific orientation being attenuated from passing through the shutter 112.

In some examples, the controller 120 detects the amount of light received by the image sensor 116 and controls the shutter 112 by dimming the shutter 112 based on the amount of light received. In some examples, the controller 120 detect the amount of light received by a separate ambient light sensor 117 and controls the shutter 112 by dimming the shutter 112 based on the amount of light received. Dimming the shutter 112 reduces the amount of light that is received by the image sensor 116. In some examples, dimming the shutter 112 prevents saturation of the image sensor 116 in bright or high light environments that would otherwise cause an overexposure of the image. The shutter 112 may be dimmed by transitioning from a transparent state to an opaque or non-transparent state. The transparency of the shutter 112 is controlled by the controller 120 applying a voltage charge to the shutter 112 in response to an amount of light detected by the image sensor 116.

In some examples, the shutter 112 may be implement different optical functions. For example, the controller 120 may control the shutter 112 to exhibit a diffusing property. That is, the shutter 112 may be adjusted to partially and/or fully diffuse the light entering the camera 110. One example effect of this adjustment to the shutter 112 may be to blur the image.

In another example, the controller 120 may control the shutter 112 to exhibit a polarizing property. That is, the shutter 112 may be adjusted to partially and/or fully polarize the light entering the camera 110. One example effect of this adjustment to the shutter 112 may be to reduce an amount of glare in the image.

In another example, the controller 120 may control the shutter 112 to exhibit a tinting property. That is, the shutter 112 may be adjusted to partially and/or fully tint the light entering the camera 110. One example effect of this adjustment to the shutter 112 may be to reduce an amount of light in the image.

The controller 120 may control the shutter 112 by dimming the shutter 112 in different dimming states. For example, the controller 120 may dim the shutter 112 to a first dim state that allows less light to pass through the shutter 112 than a no-dim state. The controller 120 may dim the shutter 112 to a second dim state that allows less light to pass through the shutter 112 than both the no-dim state and the first dim state. The controller 120 may control the shutter 112 to transition through more than the three dim states (i.e., no-dim state, first dim state, and second dim state) described above.

Figure 2A:
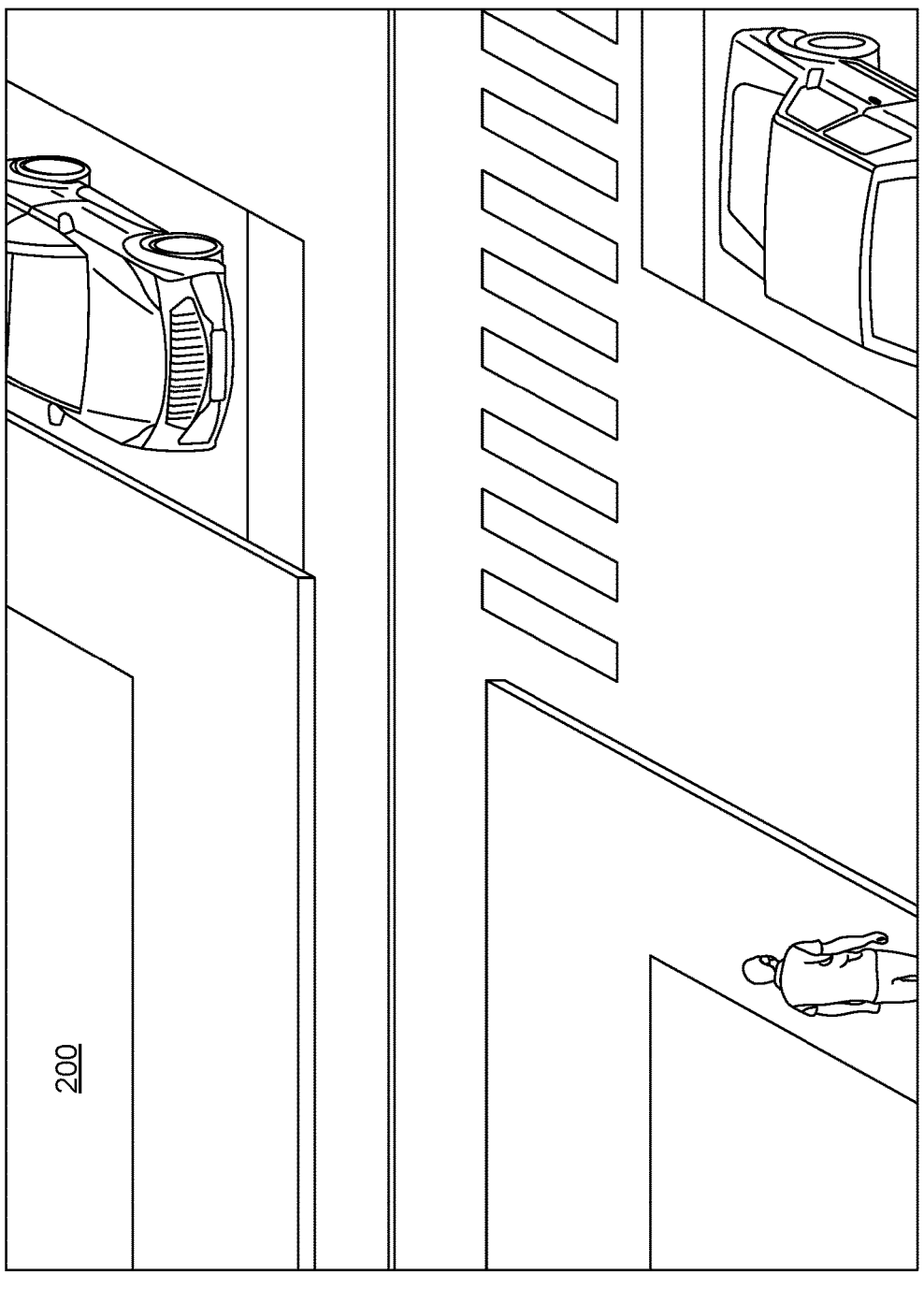
FIGS. 2A-2C illustrate an example of an image with the shutter of FIG. 1 showing different dimming states.
Figure 2B:
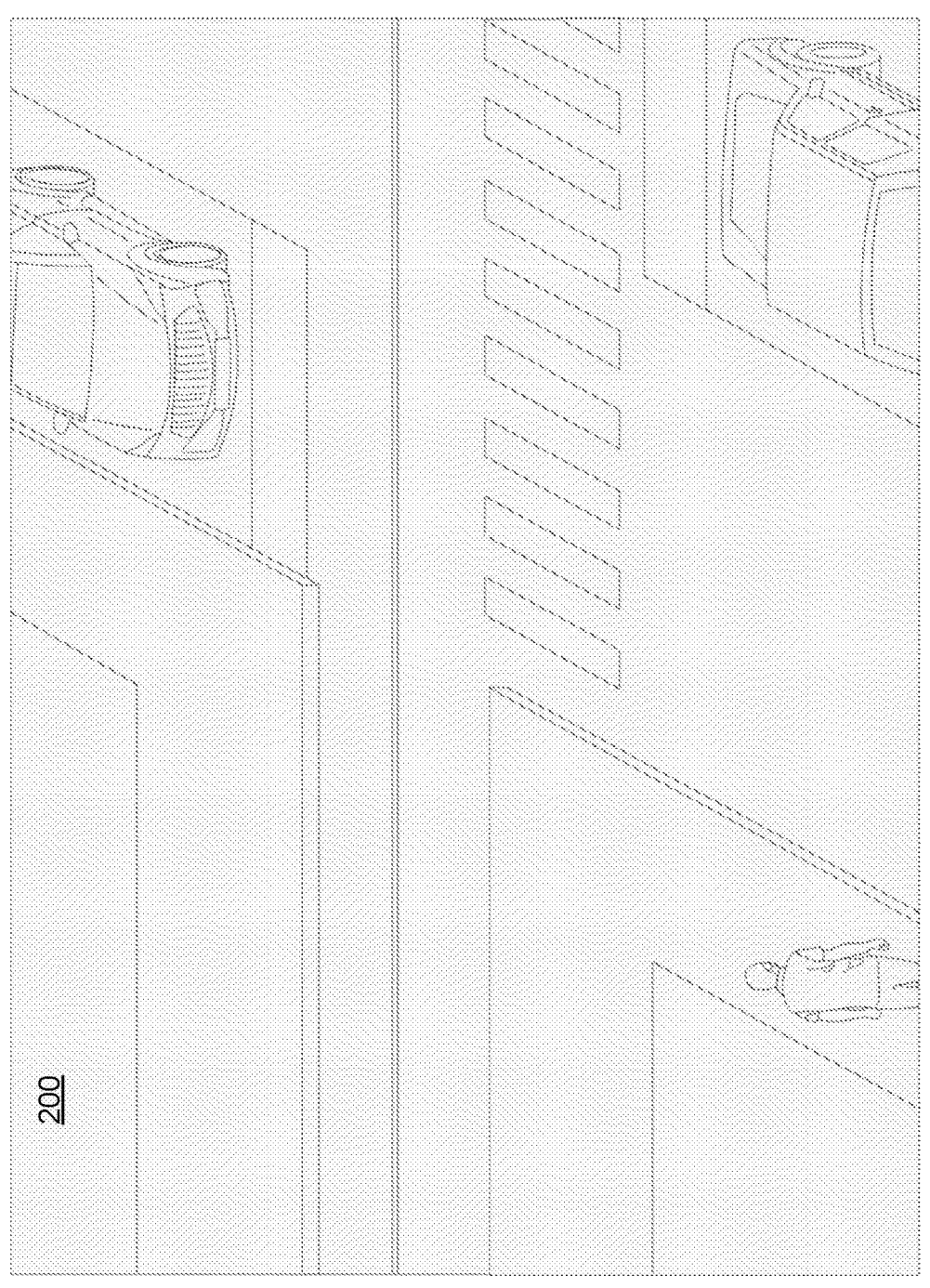
Figure 2C:
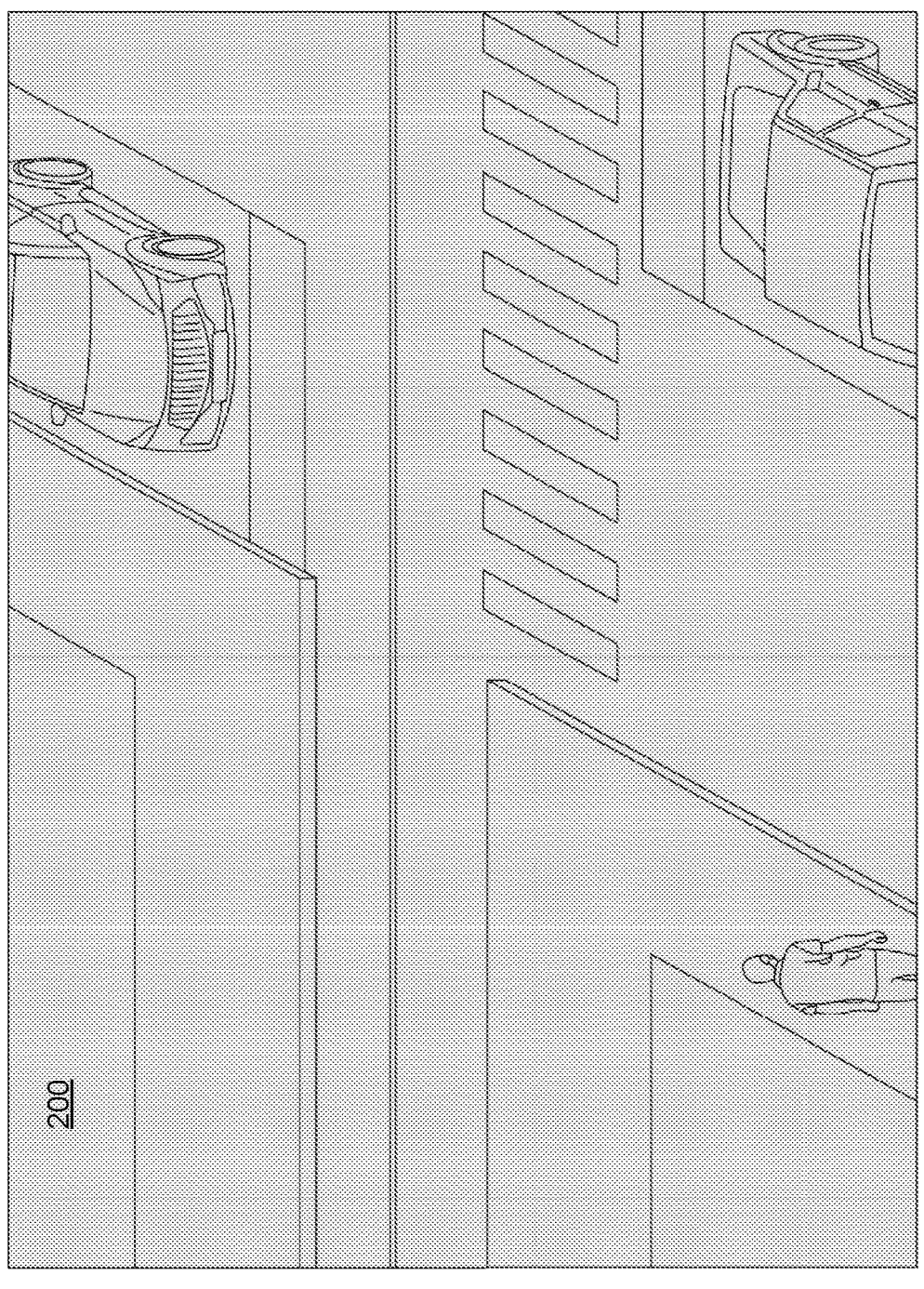

FIGS. 2A-2C illustrate an example of an image 200 with the shutter 112 of FIG. 1 showing different dimming states. The image 200 is from the perspective of the camera 110 viewing a scene in an environment. In this example, FIG. 2A illustrates a no-dim state meaning that the shutter 112 is transparent and allows the full amount of light through the shutter 112 and the lens 114 to reach the image sensor 116. Based on the amount of light that is received by the image sensor 116, the controller may control the shutter 112 to a first dim state, as illustrated in FIG. 2B. The first dim state may allow an appropriate amount of light through the shutter 112 and the lens 114 to the image sensor 116 so that an image may be captured without being overexposed due to too much light from the environment.

In this example, FIG. 2C illustrates a second dim state. In the second dim state, the controller 120 adjusts the shutter 112 to further reduce the amount of light passing through the shutter 112 and the lens 114 to the shutter 112. In the second dim state, the shutter 112 less transparent than the first dim state. The controller 120 may select an appropriate dim state based on the amount of light received by the image sensor 116.

In some examples, the controller 120 may capture an image in each of the dim states and combine the captured images from each dim state into a final image. The final image may be displayed on the output system 128. For example, the controller 120 may capture a first image in the first dim state of FIG. 2B and may capture a second image in the second dim state of FIG. 2C and then combine the first image and the second image into a final image (not shown). In this manner, the controller 120 combines multiple captured images with different dim states to render and display higher dynamic range imagery.

Referring back to FIG. 1, in some examples, the shutter 112 may include a first area 113 and a second area 115. The controller 120 may control the shutter 112 by masking the first area 113 of the shutter 112, while the second area 115 of the shutter 112 remains visible or transparent. The controller 120 may capture an image, where the image includes a masked area corresponding to the first area 113 of the shutter 112 and a visible area corresponding to the second area 115 of the shutter 112. The first area 113 and the second area 115 may be dynamically sized and shaped by the controller including based on input from the user interface 140. In some examples, the controller 120 may control the shutter 112 by masking the second area 115 of the shutter 112 and not the first area 113 of the shutter 112.

In some examples, the controller 120 masks the first area 113 of the shutter 112 by pixelating the first area 113. In this manner, a captured image may include a pixelated area corresponding to the first area 113 and a visible area corresponding to the second area 115.

Figure 3A:
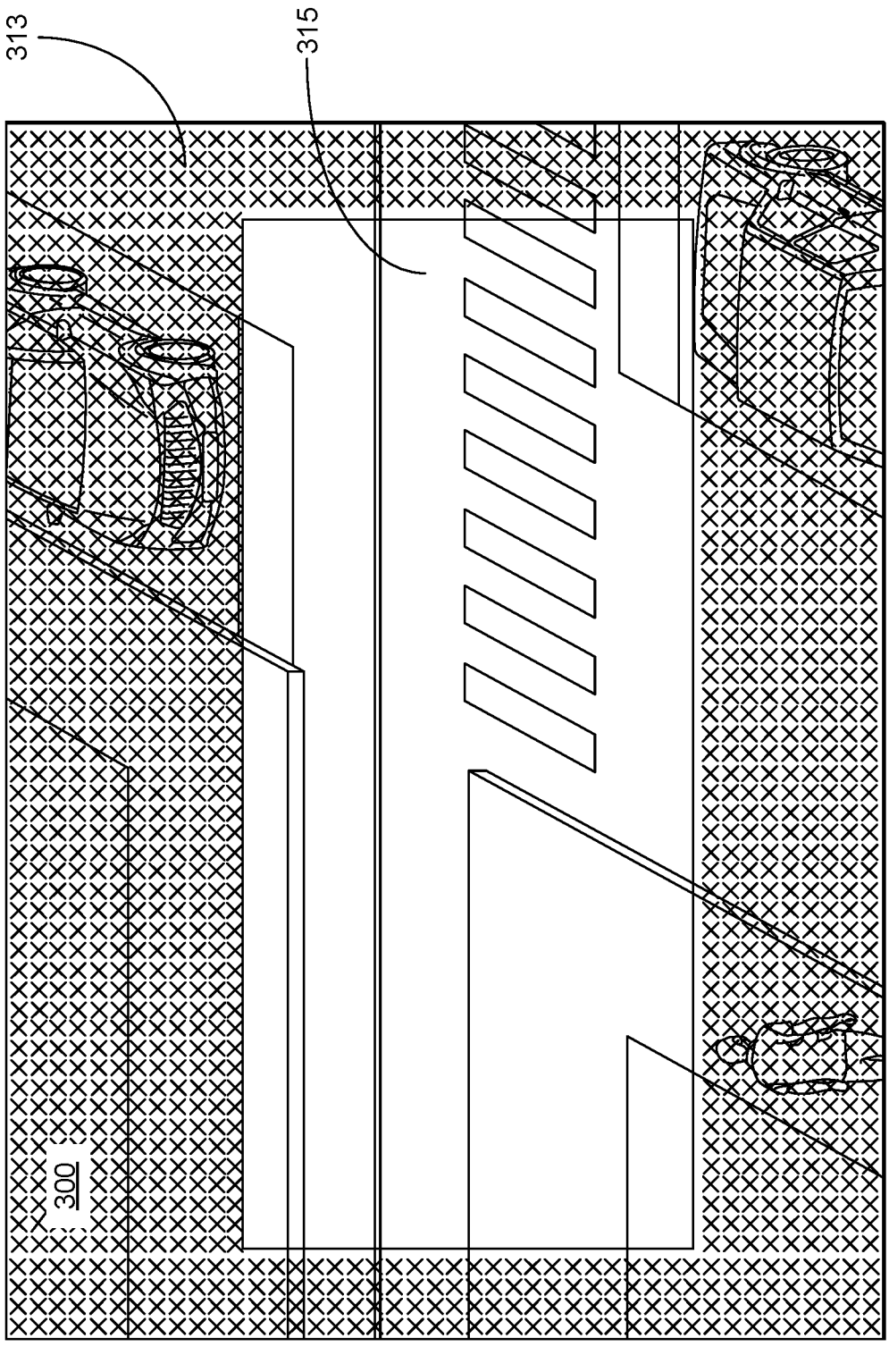
FIGS. 3A and 3B illustrate an example of an image with the shutter of FIG. 1 using a first area and a second area.
Figure 3B:
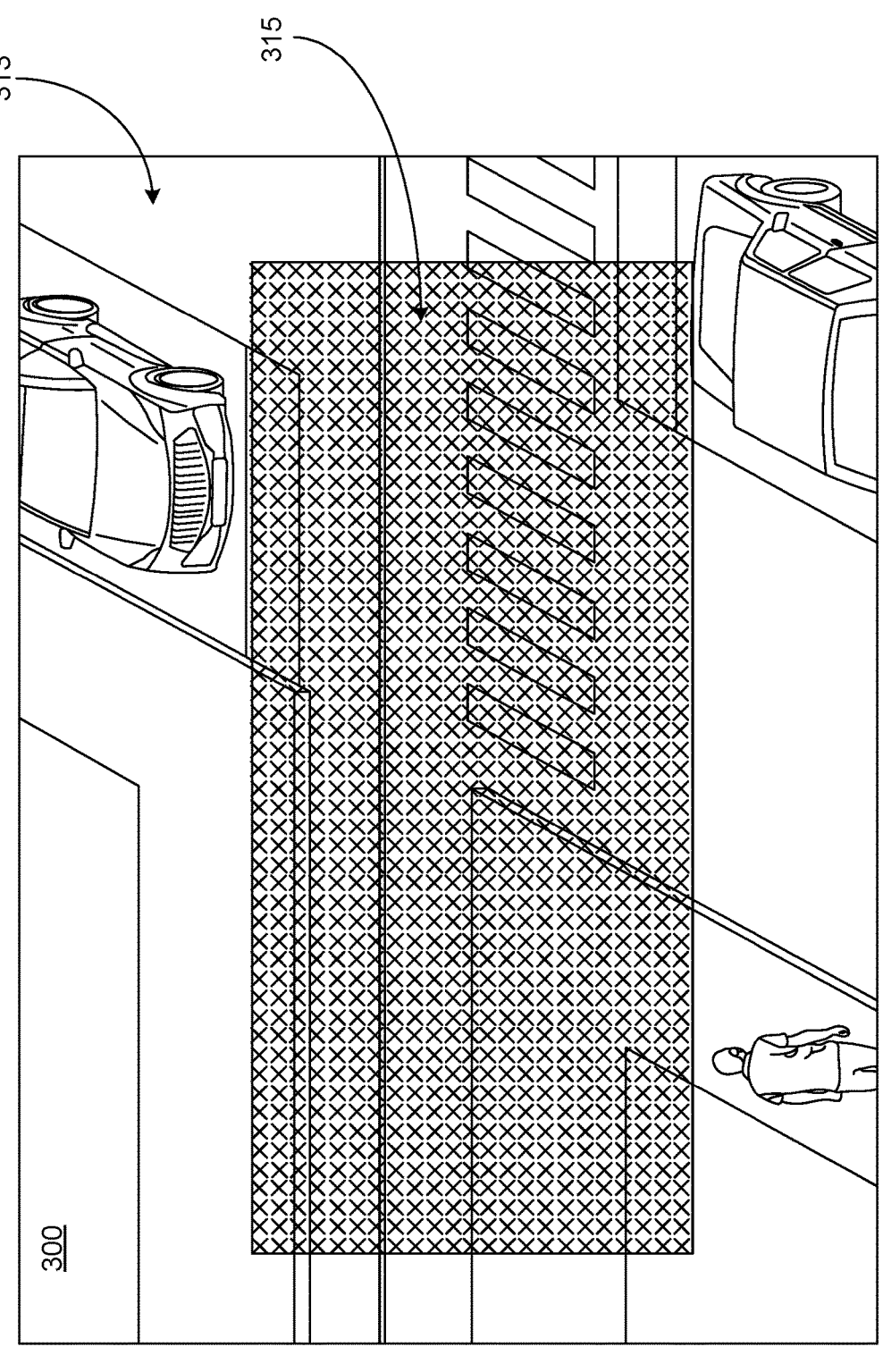

FIGS. 3A and 3B illustrate an example of an image 300 with the shutter 112 of FIG. 1 using a first area 313 and a second area 315. In FIG. 3A, the controller 120 controls the shutter 112 by masking the first area 313, while the second area 315 remains visible or transparent. In this example, the second area 315 is concentric to the first area 313. In FIG. 3B, the controller 120 controls the shutter 112 by masking the second area 315, while the first area 313 remains visible or transparent.

In some examples, a coded aperture may be implemented using the shutter 112 by using pixelation or segmentation of the shutter 112. For example, the second area 315 may be the center of the shutter 112 and the first area 313 may be the surrounding torus. In this example, the center may be segmented from the surrounding torus. In the case where the center is dimmed and the torus is transparent, a captured image may result in a high or super resolution image where there is no low spatial frequency component but the high spatial frequency is preserved. One example use context for this type of coded aperture is for tasks such as text recognition. For the case where the center is transparent and the surrounding torus is dimmed, a captured image may result having a high depth of field but low spatial resolution, which may yield a higher privacy by blocking out or blurring everything in the image except the center.

Figure 4A:
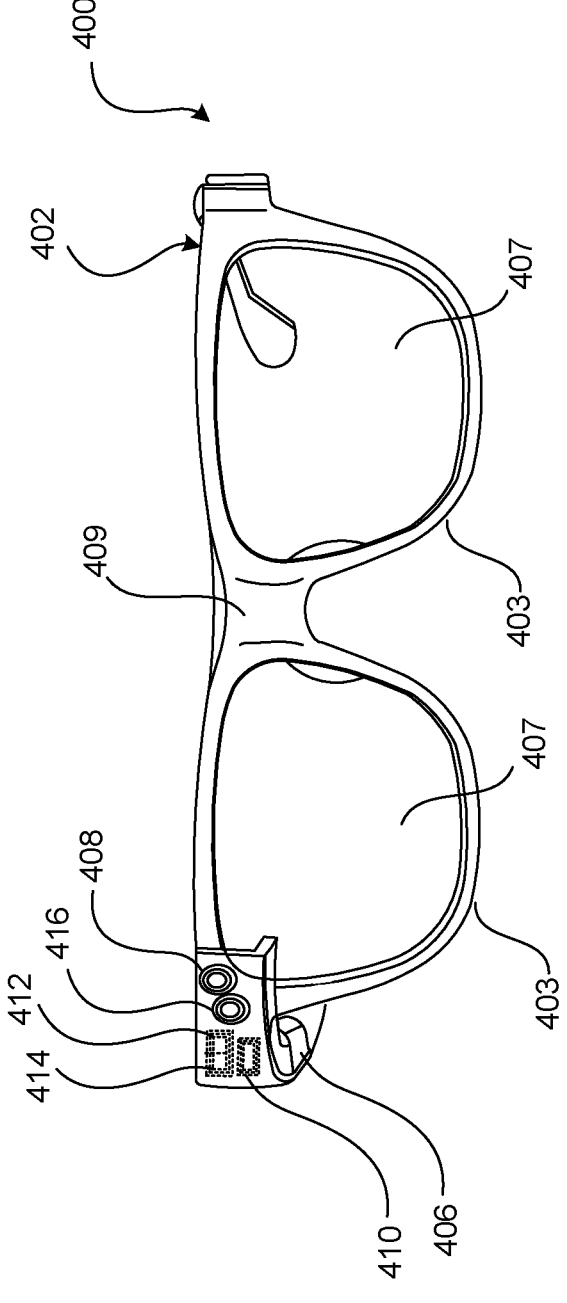
FIG. 4A is a front view.
Figure 4B:
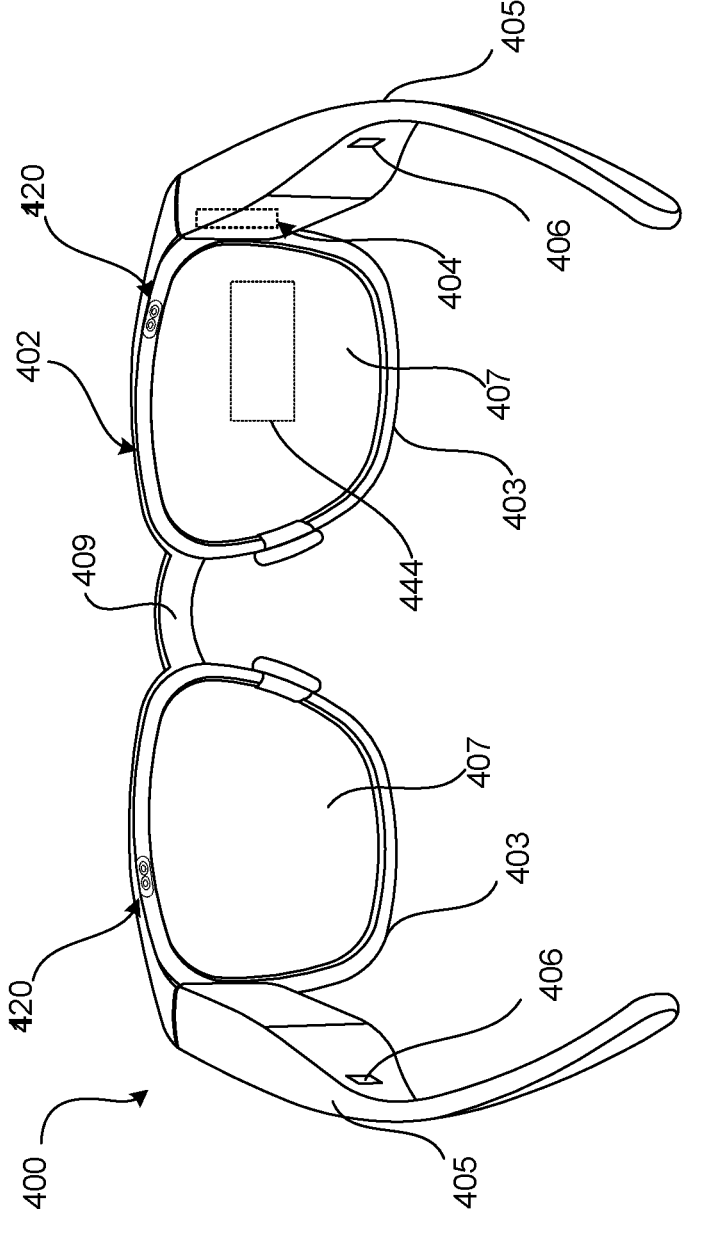
FIG. 4B is a rear view, of an example electronic device shown in FIG. 1.

An example electronic device in the form of a pair of smart glasses is shown in FIGS. 4A and 4B, for purposes of discussion and illustration. In particular, FIG. 4A is a front view, and FIG. 4B is a rear view, of the example electronic device 100 of FIG. 1, which is in the form of a head mounted device 400. The example head mounted device 400 includes a frame 402 having rim portions 403 surrounding glass portions 407, or lenses 407, and arm portions 405 coupled to a respective rim portion 403. In some examples, the lenses 407 may be corrective/prescription lenses. In some examples, the lenses 407 may be glass portions that do not necessarily incorporate corrective/prescription parameters. A bridge portion 409 may connect the rim portions 403 of the frame 402.

The example head mounted device 400 shown in FIGS. 4A and 4B, includes a display device 404 that can output visual content, for example at an output coupler 444 so that the visual content may be visible to the user. In some examples, the output coupler 444 may be substantially coincident with the lens(es) 407. In this form, the head mounted device 400 can also include an audio output device 406 (such as, for example, one or more speakers), an illumination device 408, a sensing system 410, a control system 412, at least one controller 414, and an outward facing camera 416. The camera 416 is an example of the camera 110 of FIG. 1.

In some examples, the display device 404 may include a see-through near-eye display. For example, the display device 404 may be configured to project light from a display source onto a portion of teleprompter glass functioning as a beamsplitter seated at an angle (e.g., 30-45 degrees). The beamsplitter may allow for reflection and transmission values that allow the light from the display source to be partially reflected while the remaining light is transmitted through. Such an optic design may allow a user to see both physical items in the world, for example, through the lenses 407, next to content (for example, digital images, user interface elements, virtual content, and the like) generated by the display device 404. In some implementations, waveguide, hologram or other combiner optics may be used to depict content from the display device 404.

In some examples, a gaze tracking device 420 may detect and track eye gaze direction and movement. Data captured by the gaze tracking device 420 may be processed to detect and track gaze direction and movement as a user input. In some implementations, the sensing system 410 may include various sensing devices and the control system 412 may include various control system devices including, for example, one or more controllers 414 operably coupled to the components of the control system 412. In some implementations, the control system 412 may include a communication module providing for communication and exchange of information between the head mounted device 400 and other external devices.

The example head mounted device 400 can include more, or fewer features than described above. The principles to be described herein are applicable to a head mounted wearable device with or without corrective lenses.

In the example of FIG. 4A, the camera 416 is visible to a bystander, where a bystander is someone external to the head mounted device 400. The controller 414, which may include the features and functions of the controller 120, may control the camera 416 and its associated shutter to make the shutter transparent or opaque to a bystander. In this example, the controller 414 controls the shutter to make it transparent to a bystander so that a bystander is aware that there is a potentially functioning camera that may capture images and/or video.

Figure 4C:
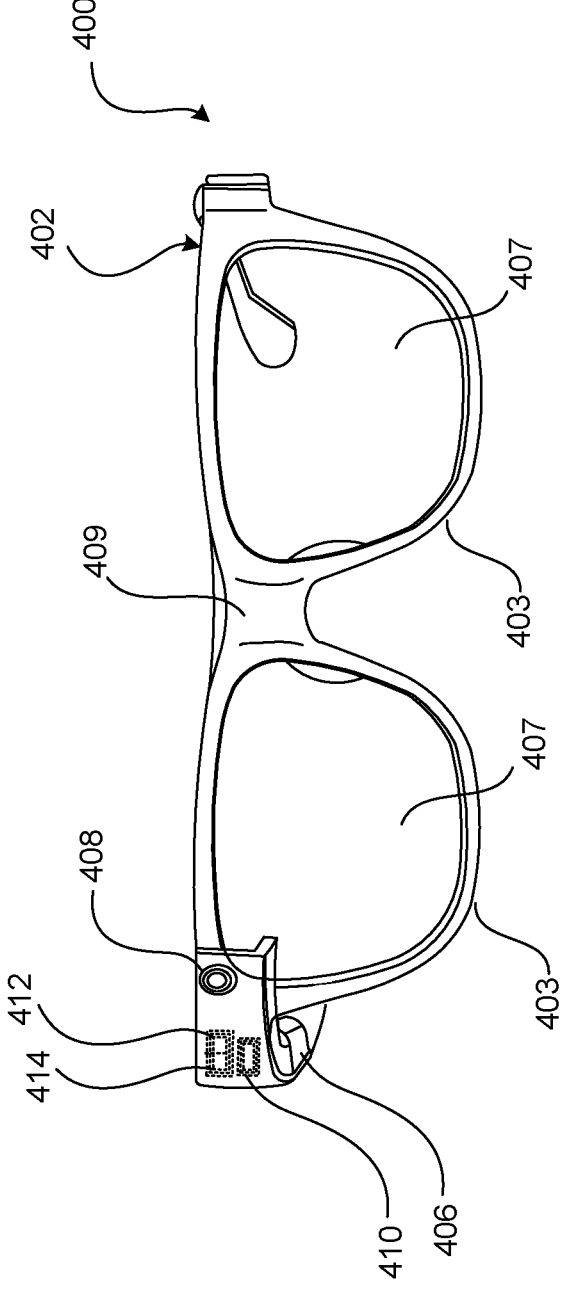
FIG. 4C is a front view of the example electronic device of FIG. 4A with the camera not visible to a bystander.

In the example of FIG. 4C, the camera 416 is not visible to a bystander and thus is not illustrated in FIG. 4C since it cannot be seen. The camera 416 is not visible and is non-functional because the controller 414 has made the shutter opaque. In this manner, the shutter functions as a privacy cover. The shutter includes a first side and a second side, the second side opposite the first side and facing the lens. The controller 414 controls the shutter by tinting the first side of the shutter to make the camera 416 non-transparent and non-visible to a bystander. The camera 416 in this configuration is also non-functional. The bystander will not see the camera 416 and the camera 416 can not capture any images or video. As discussed above, the shutter may be an electrochromic shutter. The shutter may be tinted in a manner such that it blends in with the color of the frame 402.

In some example, the user interface 140 of FIG. 1, enables a user or wearer of the head mounted device 400 to control the functioning of the shutter, including when to enable the privacy cover of the shutter such that the shutter is non-functional and is tinted and not visible to a bystander. In some examples, sensing system 410 may include a GPS and geo-location may be used to enable the privacy cover of the shutter without user interaction. For instance, a camera may not be permitted or acceptable in certain locations or certain spaces like a locker room or a doctor's office or the like.

Figure 5:
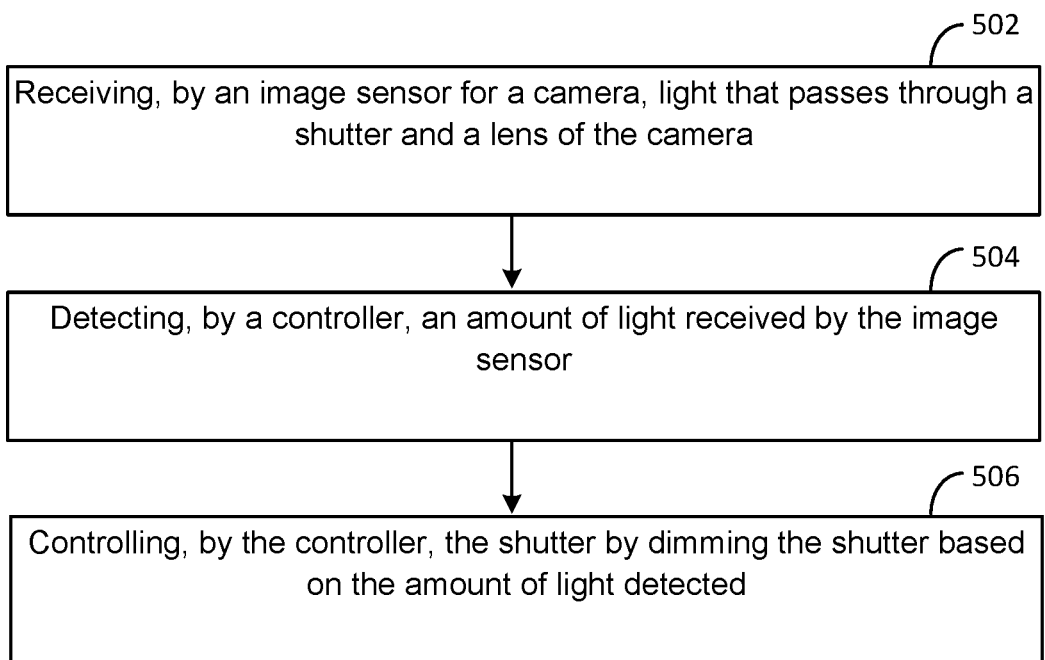
FIG. 5 is a flowchart illustrating example operations of the electronic device of FIG. 1.

FIG. 5 is an example flow diagram of a process 500 illustrating example operations of the electronic device 100 of FIG. 1. Process 500 may be a computer-implemented method. Instructions and/or executable code for the performance of the process 500 may be stored in the memory 126 and the stored instructions may be executed by the controller 120. Process 500 is also illustrative of a computer program product that may be implemented by the electronic device 100.

Process 500 includes receiving, by an image sensor for a camera, light that passes through a shutter and a lens of the camera (502). For example, with respect to FIG. 1, the image sensor 116 for the camera 110 may receive light that passes through shutter 112 and the lens 114 of the camera 110.

Process 500 includes detecting, by a controller, an amount of light received by the image sensor (504). For example, the controller 120 detects an amount of light received by the image sensor 116.

Process 500 includes controlling, by the controller, the shutter by dimming the shutter based on the amount of light detected (506). For example, the controller 120 controls the shutter 112 by dimming the shutter 112 based on the amount of light detected. As discussed above, in some examples, the shutter 112 is an electrochromic shutter.

In the following, some examples are described.

Example 1: A device includes a housing; a camera coupled to the housing, the camera including: a lens, a shutter coaxial with the lens, and an image sensor coaxial with the shutter and the lens, the image sensor configured to receive light that passes through the shutter and the lens; and a controller that: detects an amount of light received by the image sensor, and controls the shutter by dimming the shutter based on the amount of light detected.

Example 2: The device as in example 1, where the controller: controls the shutter by dimming the shutter to a first dim state; captures a first image in the first dim state; controls the shutter by dimming the shutter to a second dim state; captures a second image in the second dim state; and combines the first image and the second image into a final image.

Example 3: The device as in example 1, where the controller: controls the shutter by dimming the shutter to a plurality of dimming states; captures a plurality of images in each of the plurality of dimming states; and combines the plurality of images into a final image.

Example 4: The device of any of the preceding examples, where: the shutter includes a first area and a second area; and the controller: controls the shutter by masking the first area of the shutter, and captures an image, the image including a masked area corresponding to the first area of the shutter and a visible area corresponding to the second area of the shutter.

Example 5: The device as in example 4, where the controller masks the first area of the shutter by pixelating the first area of the shutter.

Example 6: The device as in example 4, where the first area of the shutter is concentric to the second area of the shutter.

Example 7: The device as in example 4, where the second area of the shutter is concentric to the first area of the shutter.

Example 8: The device as in any of the preceding examples, where: the shutter includes a first side and a second side, the second side opposite the first side and facing the lens; and the controller controls the shutter by tinting the first side of the shutter to make the camera non-visible and non-functional.

Example 9: The device as in any of examples 1 through 8, wherein the controller controls the shutter to make the shutter non-transparent and non-visible.

Example 10: The device as in any of the preceding examples, where: the camera further comprises an ambient light sensor that receives the light; and the controller detects the amount of light received by the ambient light sensor.

Example 11: The device as in any of the preceding examples, where the shutter is an electrochromic shutter.

Example 12: The device as in any of the preceding examples, further comprising a display, and where the controller captures an image and causes the image to display on the display.

Example 13: The device as in any of the preceding examples, where the housing is configured to be worn by a user.

Example 14: The device as in any of the preceding examples, where the device includes smart glasses.

Example 15: The device an is any of examples 1 through 12, where the device includes a mobile phone.

Example 16: A method including receiving, by an image sensor for a camera or by an ambient light sensor, light that passes through a shutter and a lens of the camera; detecting, by a controller, an amount of light received by the image sensor or by the ambient light sensor; and controlling, by the controller, the shutter by dimming the shutter based on the amount of light detected.

Example 17: The method as in example 16, further including: controlling, by the controller, the shutter by dimming the shutter to a first dim state; capturing, by the controller, a first image in the first dim state; controlling, by the controller, the shutter by dimming the shutter to a second dim state; capturing, by the controller, a second image in the second dim state; and combining, by the controller, the first image and the second image into a final image.

Example 18: The method as in example 16, further including: controlling, by the controller, the shutter by dimming the shutter to a plurality of dimming states; capturing, by the controller, a plurality of images in each of the plurality of dimming states; and combining, by the controller, the plurality of images into a final image.

Example 19: The method as in any of examples 16 through 18, where the shutter includes a first area and a second area, the method further including: controlling, by the controller, the shutter by masking the first area of the shutter; and capturing, by the controller, an image, the image including a masked area corresponding to the first area of the shutter and a visible area corresponding to the second area of the shutter.

Example 20: The method as in any of examples 16 through 19, further including controlling, by the controller, the shutter to make the shutter non-transparent and non-functional.

Example 21: The method an in any of examples 16 through 20, wherein the shutter is an electrochromic shutter.

Example 22: A computer program product, the computer program product being tangibly embodied on a non-transitory computer-readable medium and including executable code that, when executed, is configured to cause: an image sensor for a camera to receive light that passes through a shutter and a lens of the camera; and a controller to: detect an amount of light received by the image sensor, and control the shutter by dimming the shutter based on the amount of light detected.

Example 23: The computer program product as in example 22, where the executable code causes the controller to: control the shutter by dimming the shutter to a first dim state; capture a first image in the first dim state; control the shutter by dimming the shutter to a second dim state; capture a second image in the second dim state; and combine the first image and the second image into a final image.

Example 24: The computer program product as in example 22, where the executable code cause the controller to: control the shutter by dimming the shutter to a plurality of dimming states; capture a plurality of images in each of the plurality of dimming states; and combine the plurality of images into a final image.

Example 25: The computer program product as in any of examples 22 through 24, where: the shutter includes a first area and a second area; and the executable code cause the controller to: control the shutter by masking the first area of the shutter; and capture an image, the image including a masked area corresponding to the first area of the shutter and a visible area corresponding to the second area of the shutter.

Example 26: The computer program product as in any of examples 22 through 25, where the executable code causes the controller to control the shutter to make the shutter non-transparent and non-functional.

Example 27: The computer program product as in any of examples 22 through 26, where the executable code causes an ambient light sensor of the camera to receive the light; and the controller to detect the amount of light received by the ambient light sensor.

Example 28: The computer program product as in any of examples 22 through 27, where the shutter is an electrochromic shutter.

Example 29: A method including: means for receiving light that passes through a shutter and a lens of the camera; means for detecting an amount of light received by the means for receiving; and means for controlling the shutter by dimming the shutter based on the amount of light detected.

Example 30: The method as in example 29, where the shutter is an electrochromic shutter.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes, and equivalents will now occur to those skilled in the art. It is, therefore, to be understood that the appended claims are intended to cover all such modifications and changes as fall within the scope of the embodiments.

What is claimed is:

1. A device comprising:
a housing;
a camera coupled to the housing, the camera including:
   a lens,
   a shutter coaxial with the lens, and
   an image sensor coaxial with the shutter and the lens, the image sensor configured to receive light that passes through the shutter and the lens; and
a controller that:
   detects an amount of light received by the image sensor,
   controls the shutter by dimming the shutter to a dim state based on the amount of light detected,
   captures a plurality of images in a same field of view in the dim state, and combines the plurality of images into a final image, and
   adjusts a tinting of the shutter to blend with a color of the housing.

2. The device of claim 1, wherein:
the dim state includes a first dim state and a second dim state;
the plurality of images includes a first image and a second image; and
the controller:
   controls the shutter by dimming the shutter to the first dim state;
   captures the first image in the first dim state;
   controls the shutter by dimming the shutter to a second dim state;
   captures the second image in the second dim state; and
   combines the first image and the second image into the final image.

3. The device of claim 1, wherein the controller:
controls the shutter by dimming the shutter to a plurality of dimming states;
captures the plurality of images in one or more of the plurality of dimming states; and
combines the plurality of images into the final image.

4. The device of claim 1, wherein:
the shutter includes a first area and a second area; and
the controller:
   controls the shutter by masking the first area of the shutter, and
   captures the plurality of images, the plurality of images including a masked area corresponding to the first area of the shutter and a visible area corresponding to the second area of the shutter.

5. The device of claim 4, wherein the controller masks the first area of the shutter by pixelating the first area of the shutter.

6. The device of claim 4, wherein the first area of the shutter is concentric to the second area of the shutter.

7. The device of claim 4, wherein the second area of the shutter is concentric to the first area of the shutter.

8. The device of claim 1, wherein:
the shutter includes a first side and a second side, the second side opposite the first side and facing the lens; and
the controller controls the shutter by tinting the first side of the shutter to make the camera non-visible and non-functional.

9. The device of claim 1, wherein the controller controls the shutter to make the shutter non-transparent and non-visible.

10. The device of claim 1, wherein:
the camera further comprises an ambient light sensor that receives the light; and
the controller detects the amount of light received by the ambient light sensor.

11. The device of claim 1, wherein the shutter is an electrochromic shutter.

12. The device of claim 1, further comprising a display, and wherein the controller captures an image and causes the final image to display on the display.

13. The device of claim 1, wherein the housing is configured to be worn by a user.

14. The device of claim 1, wherein the device includes smart glasses.

15. The device of claim 1, wherein the device includes a mobile phone.

16. A method comprising:
receiving, by an image sensor for a camera or by an ambient light sensor, light that passes through a shutter and a lens of the camera;
detecting, by a controller, an amount of light received by the image sensor or by the ambient light sensor;
controlling, by the controller, the shutter by dimming the shutter to a dim state based on the amount of light detected and capturing a plurality of images in a same field of view of the shutter in the dim state;
combining the plurality of images into a final image; and
adjusting a tinting of the shutter to blend with a color of a housing.

17. The method of claim 16, wherein the dim state includes a first dim state and a second dim state and the plurality of images includes a first image and a second image, the method further comprising:
controlling, by the controller, the shutter by dimming the shutter to the first dim state;
capturing, by the controller, the first image in the first dim state;
controlling, by the controller, the shutter by dimming the shutter to a second dim state;
capturing, by the controller, the second image in the second dim state; and
combining, by the controller, the first image and the second image into the final image.

18. The method of claim 16, further comprising:
controlling, by the controller, the shutter by dimming the shutter to a plurality of dimming states;
capturing, by the controller, the plurality of images in one or more of the plurality of dimming states; and
combining, by the controller, the plurality of images into the final image.

19. The method of claim 16, wherein the shutter includes a first area and a second area, the method further comprising:

controlling, by the controller, the shutter by masking the first area of the shutter; and capturing, by the controller, the plurality of images, the plurality of images including a masked area corresponding to the first area of the shutter and a visible area corresponding to the second area of the shutter.

20. The method of claim 16, further comprising:

controlling, by the controller, the shutter to make the shutter non-transparent and non-functional.

21. The method of claim 16, wherein the shutter is an electrochromic shutter.

22. A computer program product, the computer program product being tangibly embodied on a non-transitory computer-readable medium and including executable code that, when executed, is configured to cause:

an image sensor for a camera to receive light that passes through a shutter and a lens of the camera; and a controller to:

detect an amount of light received by the image sensor, control the shutter by dimming the shutter to a dim state based on the amount of light detected, capture a plurality of images in a same field of view of the shutter in the dim state;

combine the plurality of images into a final image; and adjust a tinting of the shutter to blend with a color of a housing.

23. The computer program product of claim 22, wherein:

the dim state includes a first dim state and a second dim state and the plurality of images includes a first image and a second image, and the executable code causes the controller to:

control the shutter by dimming the shutter to the first dim state;

capture the first image in the first dim state;

control the shutter by dimming the shutter to the second dim state;

capture the second image in the second dim state; and combine the first image and the second image into the final image.

24. The computer program product of claim 22, wherein the executable code cause the controller to:

control the shutter by dimming the shutter to a plurality of dimming states;

capture the plurality of images in one or more of the plurality of dimming states; and combine the plurality of images into the final image.

25. The computer program product of claim 22, wherein:

the shutter includes a first area and a second area; and the executable code cause the controller to:

control the shutter by masking the first area of the shutter; and capture the plurality of images, the plurality of images including a masked area corresponding to the first area of the shutter and a visible area corresponding to the second area of the shutter.

26. The computer program product of claim 22, wherein the executable code causes the controller to control the shutter to make the shutter non-transparent and non-functional.

27. The computer program product of claim 22, wherein the executable code causes:

an ambient light sensor of the camera to receive the light; and the controller to detect the amount of light received by the ambient light sensor.

28. The computer program product of claim 22, wherein the shutter is an electrochromic shutter.

\* \* \* \* \*